(12) United States Patent
Legatti

(10) Patent No.: US 6,381,113 B1
(45) Date of Patent: *Apr. 30, 2002

(54) LEAKAGE CURRENT PROTECTION DEVICE ADAPTED TO A WIDE VARIETY OF DOMESTIC AND INTERNATIONAL APPLICATIONS

(75) Inventor: Raymond H. Legatti, Clearwater, FL (US)

(73) Assignee: Technology Research Corporation, Clearwater, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/631,553

(22) Filed: Apr. 12, 1996

Related U.S. Application Data

(63) Continuation of application No. 08/381,293, filed on Jan. 31, 1995, now abandoned, which is a continuation of application No. 07/918,664, filed on Jul. 22, 1992, now abandoned.

(51) Int. Cl.[7] .................................................. H02H 3/08
(52) U.S. Cl. ............................. 361/46; 361/47; 361/94; 361/93.6
(58) Field of Search ............................. 361/42, 44, 45, 361/46, 47, 94, 93.6

(56) References Cited

U.S. PATENT DOCUMENTS

| | | | |
|---|---|---|---|
| 3,806,764 A | 4/1974 | Hobson et al. | 317/18 D |
| 4,068,276 A | 1/1978 | Pintell | 361/46 |
| 4,216,515 A * | 8/1980 | Van Zeeland | 361/45 |
| 4,233,640 A | 11/1980 | Klein et al. | 361/44 |
| 4,578,732 A * | 3/1986 | Draper et al. | 361/45 |
| 4,598,331 A * | 7/1986 | Legatti | 361/46 |
| 4,833,564 A * | 5/1989 | Pardue et al. | 361/45 |
| 4,931,893 A * | 6/1990 | Glennon et al. | 361/45 |
| 4,933,801 A | 6/1990 | Glennon et al. | 361/45 |
| 4,994,933 A | 2/1991 | Matsuoka | 361/42 |

FOREIGN PATENT DOCUMENTS

| | | | | |
|---|---|---|---|---|
| DE | 3230557 | 2/1984 | .......... | H01H/83/14 |
| EP | 0452250 A1 | 1/1991 | .......... | H01H/83/14 |
| EP | 0522187 A1 | 7/1991 | ............ | H02H/3/33 |
| FR | 2549287 | 1/1985 | .......... | H01H/83/14 |
| FR | 2616600 | 12/1988 | .......... | H02H/3/347 |
| GB | 1107879 | 3/1968 | ............ | H02H/3/32 |
| GB | 2000398 | 1/1979 | ............ | H02H/1/00 |
| GB | 2162708 | 2/1986 | ............ | H02H/3/00 |
| GB | 2215149 | 9/1989 | ............ | H02H/3/33 |
| WO | WO91/19340 | 12/1991 | ............ | H02H/3/33 |
| WO | WO92/03866 | 3/1992 | ............ | H02H/9/00 |

* cited by examiner

Primary Examiner—Kim Huynh
(74) Attorney, Agent, or Firm—Jon Carl Gealow

(57) ABSTRACT

A leakage current protection device, such as a ground fault circuit interrupter (GFCI), is provided that can be used in single phase or polyphase systems, with a range of input voltages from 70 to 264 volts AC, frequencies of 50 or 60 hertz, and ground fault trip currents of 6 to 30 milliamperes. A leading power factor circuit is connected to the secondary winding of the GFCI differential transformer to permit the magnetic circuit to respond to pulsating DC signals. Provision is made for continuing to provide GFCI protection in the event of an open neutral lead, with a timing circuit to prevent current flow to the ground lead until current flow in the neutral lead is completely discontinued. Various types of circuit interrupting devices, such as a circuit breaker or a power converter, may be selectively utilized.

27 Claims, 3 Drawing Sheets

LEAKAGE CURRENT PROTECTION DEVICE ADAPTED TO A WIDE VARIETY OF DOMESTIC AND INTERNATIONAL APPLICATIONS

This application is a continuation of U.S. application Ser. No. 08/381,293 filed Jan. 31, 1995 which is a continuation of U.S. application Ser. No. 07/918,664 filed Jul. 22, 1992, both are now abandoned.

BACKGROUND OF THE INVENTION

1. Field of the Invention

This invention relates generally to a leakage current protection device, such as a ground fault circuit interrupter (GFCI), and more specifically, this invention relates to a leakage current protection device adapted to function effectively over a wide range of operating conditions both domestically and internationally.

2. Description of the Prior Art

GFCIs protect against undesired current paths to ground that may create hazardous conditions. A common form of such a GFCI includes a differential amplifier having a core with opposed primary windings, one primary winding having current from the power line lead passing through it, while the other primary winding has return current from the neutral lead passing through it. These primary windings produce magnetic fluxes in the core that flow in opposite directions, known as "bucking." If all of the power line current going to the load returns through the neutral lead, then the fluxes will be equal and will cancel out one another. However, if some of the load current is drawn off through an undesired path to ground, the bucking fluxes will not cancel out and there will be a resulting flux flow in the core.

A secondary winding is also located on the magnetic core. The resulting flux flow when an imbalance occurs in the currents flowing through the primary winding will induce a signal in the secondary winding. The signal induced in the secondary winding is conveyed to the control circuitry of the GFCI to open the power line lead, thus preventing the development of a dangerous condition.

This type of GFCI has been utilized for some time, and various modifications and improvements have been made from time to time to meet particular conditions. For example, in applicant's U.S. Pat. No. 4,598,331, an arrangement is disclosed in which the power line lead is opened if an open neutral or an open ground lead is detected. However, there are other situations in which it would be preferable to maintain GFCI protection even if the neutral lead is broken.

Around the world the applications for GFCI's involve a wide variety of conditions. For example, in the United States it has been decided that to insure personal protection a ground fault current in excess of 6 milliamperes cannot be permitted. However, in other countries the permissible ground fault current may be as high as 30 milliamperes. Accordingly, a GFCI for use in all international situations must be able to provide protection against ground fault currents in the range of 6–30 milliamperes.

Also, not all countries utilize the 60 hertz frequency of AC power that is utilized in the United States. Therefore, a GFCI for international applications must be able to provide protection for a frequency range of 50–60 hertz. Further, the GFCI, for maximum flexibility in application should be able to handle both single and polyphase input power, with either balanced or unbalanced phase loading, and input line to neutral voltages ranging from 70–264 volts (AC). All of these features should be achievable with load current capabilities of up to 100 amperes or more.

In some situations the magnetic circuitry of the GFCI must be able to respond to pulsating DC requirements. GFCIs in the art do not presently meet this requirement in a satisfactory manner.

Another problem that arises is in connection with multiple GFCIs connected to a power line. If one GFCI is being tested by simulating a ground fault circuit for that GFCI, the other GFCIs in the series may detect the test as a ground fault and be actuated in response thereto. A similar situation may occur when a GFCI having an alternate lead to ground is actuated and arcing of the contact opening the neutral lead maintains current flow through the neutral lead until after there is current flow through the alternate path to the ground lead. This is also detected by other GFCIs as a ground fault, and they may be undesirably actuated.

In still other situations, it may be desirable to have a choice between a circuit breaker and a power contactor to open the power line lead or leads. Prior art devices do not provide such a feature.

SUMMARY OF THE INVENTION

The present invention provides a GFCI which meets the requirement of being able to function under a wide range of operating conditions to prevent dangerous ground fault currents from occurring. The basic GFCI operation is that disclosed in connection with the prior art devices, with a number of additional features.

Also, it should be recognized that this description, although directed to a GFCI, may be equally applicable to other types of leakage current protection devices, such as an appliance leakage current interrupter (ALCI), an equipment leakage current interrupter (ELCI), or an immersion detection circuit interrupter (IDCI).

With respect to being able to continue providing GFCI protection even when a neutral lead is open, control means in the form of unidirectional current devices, such as diodes, are utilized to direct the GFCI actuating current to ground, when the neutral lead is open. In normal operation, code requirements preclude a current return path to ground. However, in the case of an open neutral, a very short pulse of current to ground may be utilized to actuate the GFCI without creating hazardous or dangerous conditions. An important aspect of the control means is that the diodes permitting current flow to ground have a higher forward voltage drop than the diodes permitting current flow to neutral. This is necessary in order to preclude current flow to ground during normal operation.

This approach may be utilized with either a single phase or polyphase arrangement, as illustrated in the preferred embodiments disclosed herein. In one of the preferred embodiments, provision is made to permit the GFCI to be used with either a single phase or a polyphase system without modification or adjustment of the device.

In order to permit the magnetic circuit of the differential transformer to respond to pulsating DC requirements, means are utilized to provide a leading power factor for the circuit. A preferred embodiment to achieve this leading power factor is to attach a suitable capacitor across a secondary winding of the differential transformer. Limitation of peak voltage on the secondary winding may be achieved by connecting a pair of clamping diodes in opposite directions across the winding in parallel with the leading power factor capacitor.

In order to protect other GPCIs from being actuated unnecessarily, a time delay means is utilized to prevent current flow to the ground lead until current flow has been discontinued in the neutral lead. The time delay of the time delay circuit is sufficiently long to permit the discontinuance of arcing as the neutral lead is opened, before permitting current flow to the ground lead. This time delay circuit is also useful in preventing undesired actuation of other GFCIs when a test circuit is utilized to provide a simulated ground fault to one of the GFCIs.

This test circuit may be formed by placing a supplemental secondary winding on the core of the differential transformer. When the test circuit is closed, such as by a manually actuated switch, current flow through the supplemental secondary winding will create a flux flow that simulates the existence of a ground fault current. Energization of the test circuit may be achieved either directly from the line lead or from a regulated output of the GFCI control circuitry. To have these GFCIs respond to various levels of permitted ground fault currents, as determined in different nations, an adjusting means may be utilized to determine the trip level of the ground fault current. At the present time, trip levels of 6, 10 and 30 milliamperes would seem to suffice, although more or less can be provided as required or desired. The adjusting means may be provided by a replaceable or variable resistor in the GFCI control circuitry.

By utilization of a regulator circuit, the GFCI may be adapted to work over a wide range of input voltages, such as 70 to 264 volts AC line-to-neutral. The voltage regulator may be of a cascade type with a pair of switching devices being forced to share the voltage drop over the desired range of input voltages.

Various circuit opening devices may be utilized such as, for example, a circuit breaker or a power contactor. Normally closed circuit breaker contacts in the power line and neutral may be actuated to open the power line and neutral leads. This is achieved by providing power to a shunt trip coil. On the other hand, if it is desired to utilize a normally energized power contactor, switching arrangements can be provided to open the line to the solenoid coil of the contactor, thus permitting the contacts to return to the normally open position.

In this way, a GFCI may be provided that operates effectively in a great number of different operating conditions, while also providing a variety of different features. Of course, it should be realized that not all of the features or operating condition versatility disclosed herein need be utilized in every situation. In many situations, less than all of the features and advantages may suffice. Hench, each of the claimed features may have significance apart from the others.

These and others objects, advantages, and features of this invention will hereinafter appear, and for purpose of illustration, but not of limitation, exemplary embodiments of the subject invention are shown in the appended drawing.

DETAILED DESCRIPTION OF THE PREFERRED EMBODIMENT

Figure 1:
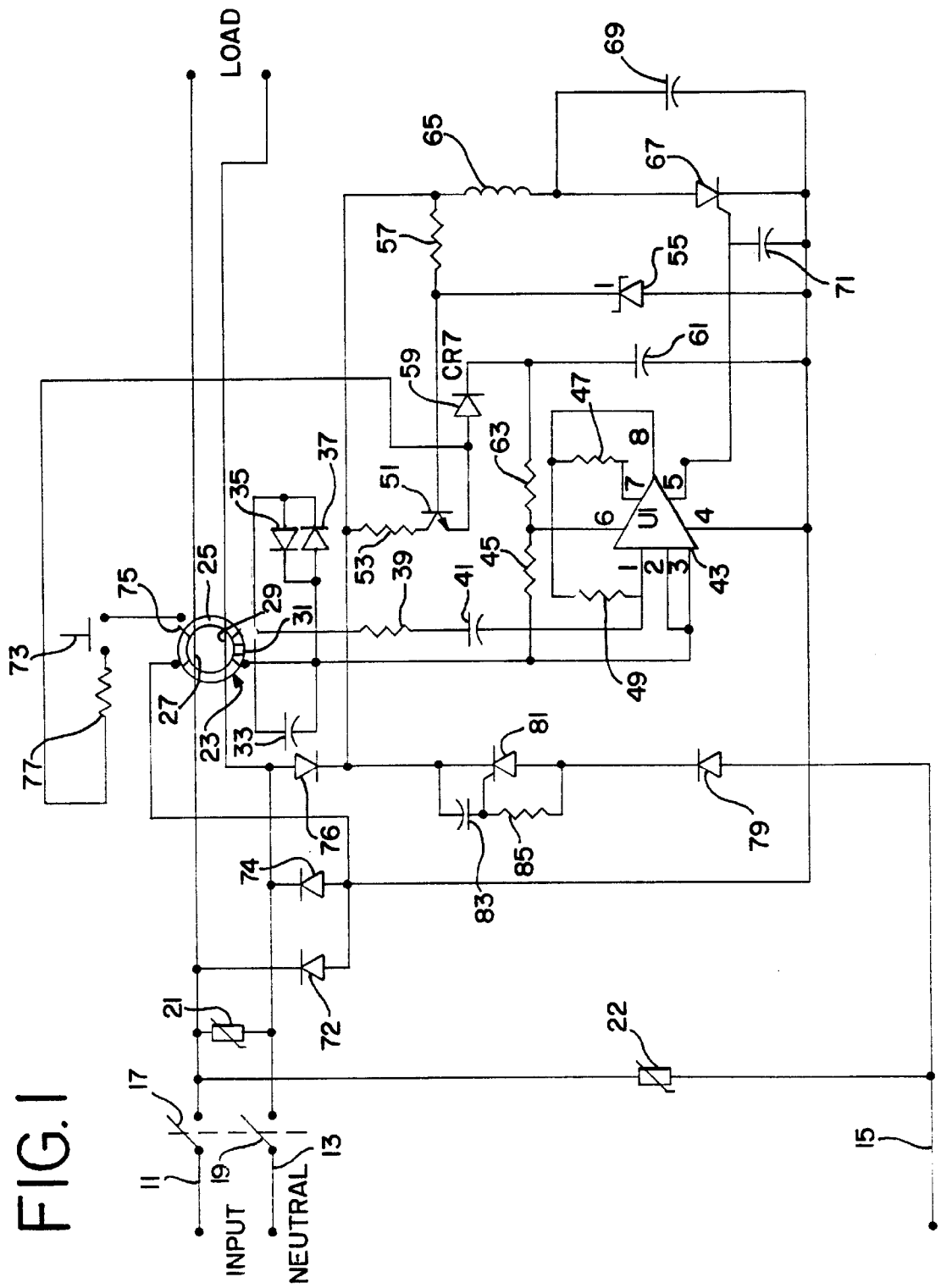
FIG. 1 is a simplified schematic circuit diagram of a first preferred embodiment of the present invention.

FIG. 1 illustrates a GFCI with a power line lead 11, a neutral lead 13 and a ground lead 15. A circuit opening contact 17 is located in power line lead 11, while a similar circuit opening contact 19 is located in the neutral lead 13. Metal oxide varistors 21 and 22 are connected between power line lead 11 and the neutral and ground leads 13 and 15 to provide transient voltage protection.

The GFCI has a differential transformer 23. Differential transformer 23 has a magnetic core 25, with the portions 27 and 29 of leads 11 and 13, respectively, passing through core 25 form the primary windings of the differential transformer. The primary windings 27 and 29 are connected to produce opposing or "bucking" fluxes. Accordingly, if all of the load current returns through the neutral lead, the fluxes of the primary windings will cancel one another.

A secondary winding 31 is also located on the transformer core 25. If a ground current in excess of a predetermined size (e.g., 6 milliamperes) occurs, the fluxes produced by the primary windings 27 and 29 will not cancel and there will be a resulting flux flow in the core 25. This flux flow will induce a signal in the secondary winding 31, which is then conveyed to the GFCI control circuitry to open the power line and neutral leads.

Since the magnetic circuitry of the differential transformer 23 must be able to respond to certain pulsating DC requirements, a capacitor 33 is connected across the secondary winding 31. Capacitor 33 provides a leading power factor that permits the magnetic circuit to respond to its pulsating DC requirements. In order to limit the amplitude of voltage peaks across the secondary winding 31, clamping diodes 35 and 37 are connected in opposite directions across the secondary winding 31, in parallel with capacitor 33.

The signal induced in secondary winding 31 is conveyed to terminals 1 and 3 of an integrated circuit that linearly amplifies and provides a stable output control or trip signal under varying conditions. A phase adjusting resistor 39 and a DC blocking capacitor 41 are connected in series from secondary winding 31 to terminal 1 of the integrated circuit 43. A damping resistor 45 is connected from one side of the secondary winding 31 to terminal 6 of the integrated circuit 43.

Resistors 47 and 49 are connected in the feedback loop from terminal 7 of integrated circuit 43 to terminal 1 thereof. Resistor 47 is utilized to limit asymmetry in the potential signals of the different polarities. Resistor 49 is the feedback gain control, and it is this resistor that may be varied to adjust the ground current tripping level for the GFCI. This may be achieved by making the resistor 49 replaceable so that different magnitude resistors may be selectively utilized, or, alternatively, by using a variable resistor with selectable discrete settings. At the present time, settings for trip levels of 6 milliamperes, 10 milliamperes and 30 milliamperes are probably all that are required, but the number of discrete settings may be altered as needed or desired. Transistor 51, resistor 53, Zener diode 55, resistor 57, diode 59 and capacitor 61 provide a voltage regulator circuit that permits the GFCI to operate over a wide range of input voltages from 70 to 264 volts AC line-to-neutral. In addition, the circuit essentially forms a constant current device that reduces power dissipation.

Resistor 63, connected to terminal 6 of the integrated circuit 43, is also a part of this voltage regulator circuit. The output of the integrated circuit, at terminal 5, is conveyed to the gate of an SCR 67 to trigger it into conduction. As SCR 67 conducts, the current flow through solenoid 65 opens the contact 17 and 19 to break the power flow to the load. Capacitor 69 connected across the SCR 67 serves to suppress DVDT (transient voltage attitude) characteristics, while capacitor 71 provides a time constant to eliminate nuisance tripping.

A test circuit has a test switch 73 that completes a circuit through a supplemental secondary winding 75 located on the core 25 of differential transformer 23. A current limiting resistor 77 is located in the test circuit. Actuation of test switch 73 to complete the circuit through the supplemental secondary winding simulates the effect of a ground fault circuit so that the operation of the GFCI may be tested.

As may be seen, the embodiment of FIG. 1 is a single phase AC circuit. Diodes 72, 74, 76 and 79 form a rectified half-wave power supply for the GFCI control circuitry, with alternate returns to the neutral and ground leads, and with direct current connections between the neutral and ground leads.

The diode 79 is connected from the ground lead to the output side of the GFCI control circuitry. Diode 79 provides an alternate path to ground in the event that the neutral lead should be open. Similarly, if there is a potential above a predetermined minimum level from the neutral lead to the ground lead, or from the ground lead to the neutral lead, diodes 74 and 79 provide a current path for energizing the GFCI, even if the power line lead is open or not connected. In order to ensure that there is no current flow to ground when the neutral lead is intact (during normal operation), diode 79 is selected to have a greater forward voltage drop than diode 76. Thus, as opposed to the automatic opening of the contacts 17 and 19 when an open neutral is detected, as in U.S. Pat. No. 4,598,331, the GFCI may still be actuated in the event of an open neutral. Also, the current flow in the ground lead for actuation of the GFCI is of sufficiently short duration that it does not create any health hazards.

Connected in series with diode 79 is a timing circuit formed by an SCR 81, capacitor 83 and resistor 85. In the event of an open neutral, DC gating for the SCR 81 is achieved through diode 79. During opening of contact 19, there will be some arcing during the initial opening phase. This arcing creates an impedance such that the forward voltage drop across diode 76 and the contact 19 may become greater than the forward voltage drop of diode 79. Any current flow through diode 79 to ground would appear as a ground fault to other GFCIs upstream of this particular GFCI. The result would be to cause actuation of such a GFCI.

The timing circuit of SCR 81, capacitor 83 and resistor 85 is set to introduce a time delay in the forward current flow through diode 79 that is sufficiently long to permit the arcing at contact 19 to fully clear. In this way, there will be no current flow through the diode 79 unless there is an actual ground fault condition, when energy is being supplied to the load through the power line lead 11. This timing circuit also prevents inadvertent tripping of other GFCI circuits when the test circuit is actuated by closing switch 73.

Figure 2:
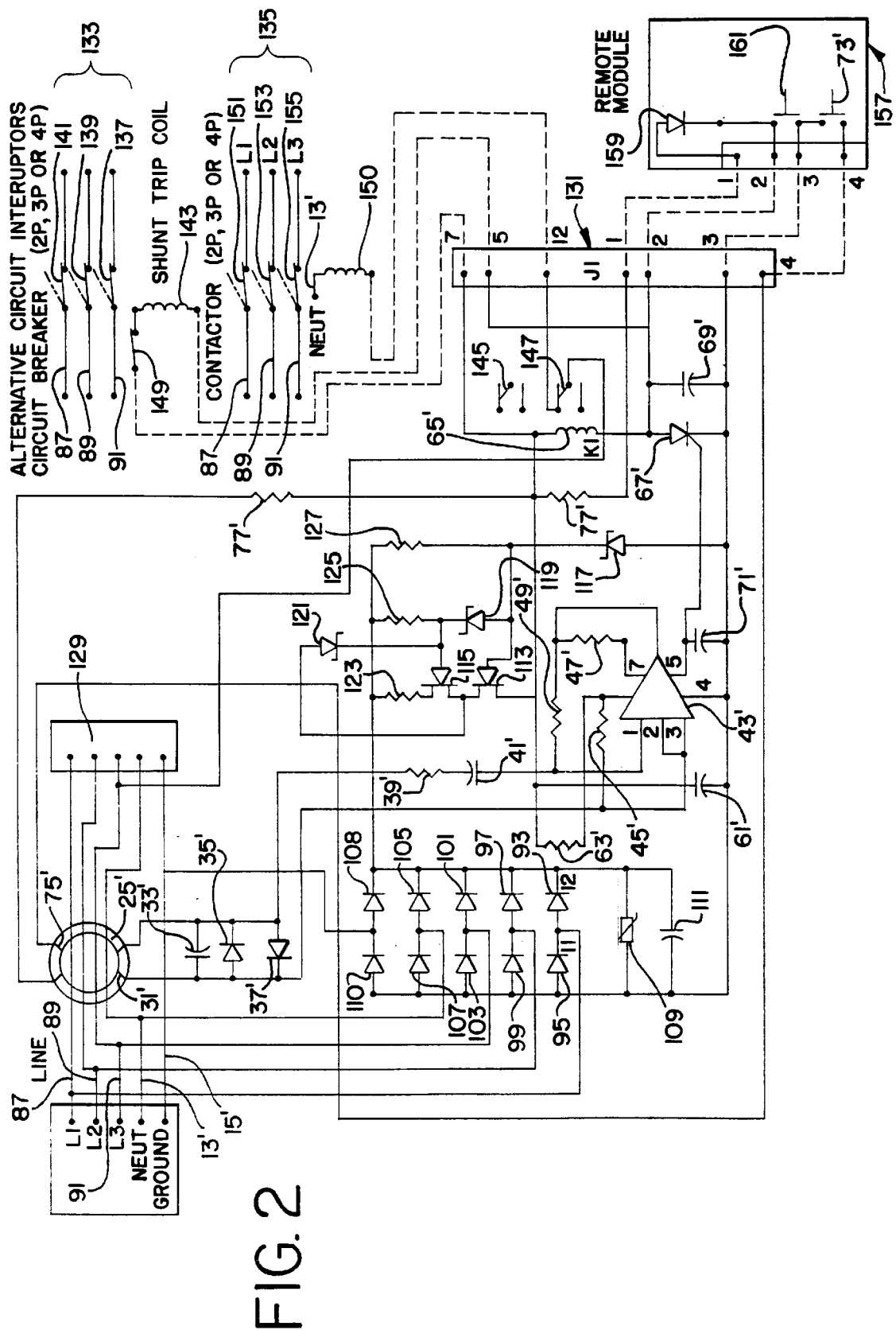
FIG. 2 is a simplified schematic circuit diagram of a second preferred embodiment of the present invention.

A polyphase arrangement similar to that of the embodiment of FIG. 1, with some additional features depicted, is shown in the embodiment of FIG. 2. For ease of reference the components of FIG. 2 that are the same as those of FIG. 1 have been marked with the same numerals primed.

In this multi-phase embodiment, there are three power line leads 87, 89 and 91. As this GFCI is arranged to be connected to either a poly-phase or single phase source, power line lead 91 would correspond to power line lead 11 in the FIG. 1 embodiment, if a single phase source were utilized. In this poly-phase circuit, a full wave power supply, rather than the half wave power supply of the FIG. 1 embodiment, is utilized. The rectified full wave power is obtained through diodes 93, 95, 97, 99, 101, 103, 105 and 107. In function, these diodes correspond to the diodes 72, 74 and 76 of the FIG. 1 embodiment. As an example, it may be seen that on the positive half cycles for the power on lead 87, the path is through diode 93 to the GFCI control circuitry and back to neutral through diode 107. On the negative half cycles, the path of current flow is through diode 95 to the GFCI control circuitry and back to neutral through diode 105. Each of the other power line lead routes are through the associated diode pairs 97, 99 and 101, 103.

Diodes 108 and 110 provide an alternate path to ground corresponding to the function of diode 79 in the FIG. 1 embodiment. Accordingly, the GFCI will still function in the presence of an open neutral lead 15'. A cascade voltage regulator circuit is provided by breakdown devices 113 and 115 (shown here as metal oxide semiconductor field effect transistors—NOS FET's—although any suitable device could be used); Zener diodes 117, 119 and 121; resistors 123, 125, 127 and 63'; and capacitor 61'. With this arrangement, the MOS FET 113 regulates the voltage from approximately 50 volts to approximately one half of the maximum DC voltage of 650 volts. The MOS FET 115 continues the regulation up to the maximum voltage.

As this embodiment utilizes a modular approach to permit utilization of different circuit interrupters, as well as other options, such as a remote module for testing and resetting, lines 87, 89, 91, 13' and 15' are shown ending in a terminal board 129. Similarly, various connections from the GFCI control circuitry are made to the terminal board 131. Alternative circuit interrupters are shown as a circuit breaker 133 or a power contactor 135. If the circuit breaker option is utilized, the power line leads 87, 89 and 91 would be connected as shown in the device 133, while the normally closed contacts 137, 139 and 141 would be controlled by the shunt trip coil 143. It may be seen that the solenoid 65', which in the FIG. 1 embodiment would control the opening of the normally closed switches 17 and 19, controls contacts 145 and 147, as well as contact 149 for the shunt trip coil 143. Upon energization of the solenoid 65', contact 149 would be closed so that shunt trip coil 143 can be energized through the terminals 5 and 7 of the terminal board 131. Energization of shunt trip coil 143 opens the contacts 137, 139 and 141 (as well as the neutral lead contact 19' not shown).

If the power contactor 135 is connected to terminal board 139 solenoid coil 150 is energized from power line lead 91 through the normally closed contact 147. In the event of energization of solenoid 65', contact 147 is opened to de-energize the coil 150. De-energization of the solenoid coil 150 permit the normally closed contacts 151, 153 and 155 in leads 87, 89 and 91, respectively, to return to the normally open position.

A remote module 157 may be connected to the terminal board 131, as shown. Various different features could be included as desired. Shown here are a light emitting diode (LED) 159 that would be energized upon production of a GFCI trip signal to give a visual indication of tripping. Another feature included in this remote module 157 is a reset button for resetting the GFCI after actuation by the presence of a ground fault current. The final feature shown here is the placing of test switch 73' in the remote module, rather than having it in the GFCI itself.

Figure 3:
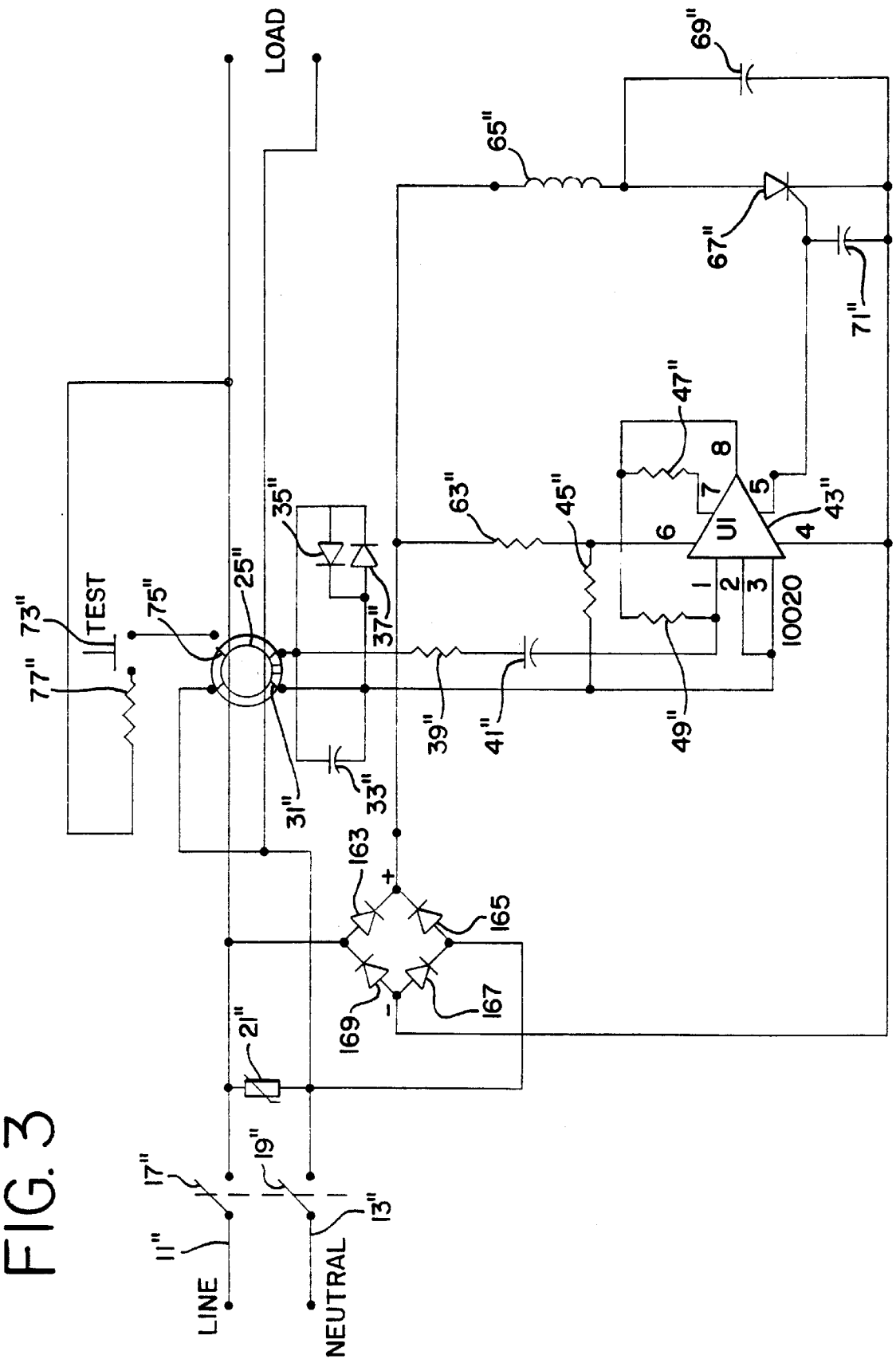
FIG. 3 is a simplified schematic circuit diagram of a third preferred embodiment of the present invention.

FIG. 3 is a simplified embodiment of the GFCI of FIG. 1, in which the open neutral line protection feature has been eliminated. For some applications, this simplified version without open neutral protection will suffice to provide the necessary protection at a significantly lower cost.

For ease of reference, the components of the circuit of the FIG. 3 embodiment are identified by utilizing the same numerals as in the FIG. 1 embodiment, but with a double prime. It may be seen that this embodiment utilizes a full wave rectifier power supply with diodes 163, 165, 167 and 169, rather than the half-wave rectified power supply of the FIG. 1 embodiment. Other than that, the basic operation of this circuit is substantially the same as that of the FIG. 1 embodiment, but without features such as the open neutral lead protection, the associated timing circuit and the particular voltage regulator of the FIG. 1 embodiment.

It should be understood that various modifications, changes and variations may be made in the arrangement, operation and details of construction of the elements disclosed herein without departing from the spirit and scope of this invention.

What is claimed is:

1. A leakage current protection device for use in an electrical system having a neutral lead, a ground lead and at least one power line lead extending from a source of energy to a load comprising:

a differential transformer having a core, opposed primary windings producing bucking fluxes representative of current to the load and current from the load, and a secondary winding;

circuit opening means to open the power line lead in response to a trip signal generated in said secondary winding when a leakage current above a predetermined magnitude occurs;

a supplemental secondary winding on said differential transformer;

switch means to close the circuit to said supplemental secondary winding to simulate the occurrence of a leakage current in order to test the protection device; and time delay means to prevent current flow to the ground lead until said circuit opening means has been actuated by current flow to the neutral lead, thereby decreasing the chances that other protection devices in the electrical system would erroneously sense the test simulation as a leakage current.

2. A leakage current protection device for use in an electrical system having a neutral lead, a ground lead, and at least one power line lead extending from a source of energy to a load comprising:

a differential transformer having a core, opposed primary windings producing bucking fluxes representative of current to the load and current from the load, and a secondary winding;

circuit opening means to open the power line lead in response to a trip signal generated in said secondary winding when a leakage current above a predetermined magnitude is detected; and a control means comprising;

a rectifier to provide DC power from the power line lead to control circuitry for the protection device;

first unidirectional current means connected from said protection device control circuitry to the neutral lead;

second unidirectional current means connected from said protection device control circuitry to ground, said second unidirectional current means having a higher forward voltage drop than said first unidirectional current means; and third unidirectional current means connected from said protection device control circuitry to the neutral lead with a polarity opposite that of said first unidirectional current device; said control means providing power to actuate said circuit opening means in the event of a leakage current above a predetermined magnitude whenever any two of the power line, neutral and ground leads between the power source and the protective device remain intact and a voltage in excess of a predetermined minimum potential exists between said two intact lines.

3. A leakage current protection device as claimed in claim 2 and further comprising a metal oxide varistor connected across said rectifier to provide transient voltage protection.

4. A leakage current protection device as claimed in claim 2 wherein said rectifier is a full wave rectifier for a polyphase three power line lead configuration.

5. A leakage current protection device as claimed in claim 4 wherein said full wave rectifier comprises a pair of diodes connected in series across the protection device control circuitry for each of said power line leads, with each of said power line leads connected to the midpoint of an associated pair of diodes.

6. A leakage current protection device as claimed in claim 5 wherein said first, second and third unidirectional current means comprises:

a first pair of series connected diodes located across the protection device control circuitry in parallel with said rectifier pairs of diodes, the midpoint of said first pair of diodes being connected to the neutral lead; and a second pair of series connected diodes located across the protection device control circuitry in parallel with said rectifier pairs of diodes and said first pair of diodes, the midpoint of said second pair of diodes being connected to the ground lead.

7. A leakage current protection device for use in an electrical system having at least a neutral lead and a power line lead extending from a source of energy to a load comprising:

a differential transformer having a cores opposed primary windings producing bucking fluxes representative of current to the load and from the load, and a secondary winding;

power factor adjustment means connected across said secondary winding for tuning said differential transformer circuit to have a leading power factor, which permits the protective device to efficiently respond to pulsating DC signals over a large range of input voltages;

regulating means acting in conjunction with said power factor adjustment means to permit the protection device to efficiently and effectively respond to a range of line-to-neutral AC input voltages varying from 70 to 264 volts;

adjusting means to selectively set the protection device to respond to a leakage current in the nominal range of 6 to 30 milliamperes;

an amplifier circuit to linearly amplify the output of said secondary winding and provide a stable trip signal under varying conditions;

circuit opening means to open the power line lead in response to a trip signal being generated in said amplifier circuit as a result of a leakage current above a predetermined magnitude producing a current in said secondary winding;

a supplemental secondary coil on said differential transformer;

switch means to close the circuit to said supplemental circuit to simulate the occurrence of a leakage current in order to test the protection device; and time delay means to prevent current flow to the ground lead until said circuit opening means has been actuated by current flow to the neutral lead, thereby decreasing the chances that other protection devices in the electrical system would erroneously sense the test simulation as a leakage current.

8. A leakage current protection device for use in an electrical system having at least a neutral lead and a power line lead extending from a source of energy to a load comprising:
   a differential transformer having a core, opposed primary windings producing bucking fluxes representative of current to the load and current from the load, and a secondary winding;
   power factor adjustment means comprising capacitive means for tuning the inductance of said differential transformer so that said differential transformer circuit has a leading power factor, said power factor adjustment means connected across said secondary winding for permitting the protection device to respond to pulsating DC signals;
   a linear amplifier circuit to amplify the output of said secondary winding and provide a stable trip signal under varying conditions; and
   circuit opening means to open the power line lead in response to a trip signal being generated in said amplifier circuit as a result of a leakage current above a predetermined magnitude producing a current in said secondary winding.

9. A leakage current protection device as claimed in claim 8 and further comprising a pair of clamping diodes connected in opposite directions across said secondary winding in parallel with said capacitive means.

10. A leakage current protection device as claimed in claim 8 and further comprising regulating means to provide a substantially constant operating voltage for said circuit opening means over a range of line-to-neutral AC input voltages of 70 to 264 volts, said capacitive means increasing the sensitivity of said differential transformer for permitting efficient and effective operation over the full range of input voltages.

11. A leakage current protection device as claimed in claim 8 and further comprising adjusting means to selectively set the protection device to respond to a leakage current in the nominal range of 6 to 30 milliamperes.

12. A leakage current protection device as claimed in claim 8 and further comprising:
   a supplemental secondary winding on said differential transformer; and
   switch means to close the circuit to said supplemental secondary winding to simulate the occurrence of a leakage current in order to test the protection device.

13. A leakage current protection device for use in an electrical system having a neutral lead, a ground lead, and at least one power line lead extending from a source of energy to a load comprising:
   a differential transformer having a core, opposed primary/windings producing bucking fluxes representative of current to the load and current from the load, and a secondary winding;
   circuit opening means to open the power line lead in response to a trip signal generated in said secondary winding when a leakage current above a predetermined magnitude is detected; and
   control means to provide power to actuate said circuit opening means in the event of a leakage current above a predetermined magnitude whenever the power line lead is broken and the ground lead and the neutral lead are intact, and when the ground lead is broken and the power line lead and the neutral lead remain intact, and when the neutral lead is broken and the power line lead and the ground line remain intact, and a voltage in excess of a predetermined minimum potential exists between said two intact leads.

14. A leakage current protection device as claimed in claim 13 and further comprising regulating means to provide a substantially constant operating voltage for said circuit opening means over a range of line-to-neutral AC input voltages of 70 to 264 volts.

15. A leakage current protection device as claimed in claim 14 and further comprising means to selectively set the protection device to respond to leakage current in the nominal range of 6 to 30 milliamperes.

16. A leakage current protection device as claimed in claim 13 and further comprising adjusting means to set the protection device to respond to leakage current in the range of 6 to 30 milliamperes.

17. A leakage current protection device as claimed in claim 13 wherein said circuit opening means comprises:
   a circuit breaker connected to open the power line lead when energized;
   a contactor to open the power line lead when de-energized;
   connector means for alternatively selectively connecting a single one of said circuit breaker and said contactor to a regulated voltage power supply in the protection device; and
   switch means responsive to a trip signal generated in said secondary winding when leakage current above a predetermined magnitude occurs, said switch means energizing said circuit breaker when it is connected and for de-energizing said contactor when it is connected.

18. A leakage current protection device as claimed in claim 17 and further comprising regulating means to provide a substantially constant operating voltage for said circuit opening means over a range of line-to-neutral AC input voltages of 70 to 264 volts.

19. A leakage current protection device as claimed in claim 18 and further comprising adjusting means to set the protection device to respond to a leakage current in the nominal range of 6 to 30 milliamperes.

20. A leakage current protection device claimed in claim 17 and further comprising adjusting means to set the protection device to respond to a leakage current in the nominal range of 6 to 30 milliamperes.

21. A leakage current protection device for use in an electrical system having a neutral lead, a ground lead, and at least one power line extending from a source of energy to a load comprising:
   a differential transformer having a core, opposed primary windings producing bucking fluxes representative of current to the load and current from the load, and a secondary winding;
   a supplemental secondary coil on said differential transformer;
   switch means to close the circuit to said supplemental secondary winding to simulate the occurrence of a leakage current in order to test the protection device;
   circuit opening means to open the power line lead in response to a trip signal generated in said secondary winding when a leakage current above a predetermined magnitude is detected, said circuit opening means including;

a circuit breaker connected to open the power line lead when energized;

a contactor to open the power line lead when de-energized;

connector means for alternatively selectively connecting a single one of said circuit breaker and said contactor to a regulated voltage supply in the protection device;

switch means responsive to a trip signal generated in said secondary winding when a leakage current above a predetermined magnitude occurs, said switch means energizing said circuit breaker when it is connected and de-energizing said contactor when it is connected; and control means to provide power to actuate said circuit opening means in the event of a leakage current above a predetermined magnitude whenever any two of the power line, neutral and ground leads between the power source and the protection device remain intact and a voltage in excess of a predetermined minimum potential exists between said two intact lines; and time delay means to prevent current flow to the ground lead until said circuit opening means has been actuated by current flow to the neutral lead, thereby decreasing the chances that other protection devices in the electrical system would erroneously sense the test simulation as a leakage current above a predetermined magnitude.

22. A leakage protection device as claimed in claim 21 and further comprising adjusting means to set the protection device to respond to a leakage current in the nominal range of 6 to 30 milliamperes.

23. A leakage current protection device as claimed in claim 22 and further comprising regulating means to provide a substantially constant operating voltage for said circuit opening means over a range of line-to-neutral AC input voltages of 70 to 264 volts.

24. A leakage current protection device for use with either a single phase or a polyphase power system having a neutral lead, a ground lead and at least one power line lead extending from a source of energy to a load comprising:

a differential transformer having a core, opposed primary windings producing bucking fluxes representative of current to the load and current from the load, and a secondary winding;

connecting means to ensure that either a single phase or polyphase input will properly energize the protection device;

circuit opening means to open all power line leads in response to a trip signal generated in said secondary winding when a leakage current above a predetermined magnitude occurs; and control means to provide power to actuate said circuit opening means in the event of a leakage current above a predetermined magnitude whenever a power line lead is broken, and the ground lead and the neutral lead are intact, and when the ground lead is broken and a power line lead and the neutral lead remain intact, and when the neutral lead is broken and a power line lead and the ground line remain intact and a voltage in excess or a predetermined minimum potential exists between said two intact leads.

25. A leakage current protection device for use in an electrical system having a neutral lead, a ground lead, and at least one power line extending from a source of energy to a load comprising:

a differential transformer having a core, opposed primary windings producing bucking fluxes representative of current to the load and current from the load, and a secondary winding;

a supplemental secondary winding on said differential transformer;

switch means to close the circuit to said supplemental secondary winding to simulate the occurrence of a leakage current in order to test the protection device;

circuit opening means to open the power line lead in response to a trip signal generated in said secondary winding when a leakage current above a predetermined magnitude is detected;

control means to provide power to actuate said circuit opening means in the event of a leakage current above a predetermined magnitude whenever any two of the power line, neutral and ground leads between the power source and the protection device remain intact and a voltage in excess of a predetermined minimum potential exists between said two intact lines: and time delay means to prevent current flow to the ground lead until said circuit opening means has been actuated by current flow to the neutral lead, thereby decreasing the chances that other protection devices in the electrical system would erroneously sense the presence of a leakage current above a predetermined magnitude if the neutral lead is unbroken.

26. A leakage current protection device as claimed in claim 25 and further comprising adjusting means to set the protection device to respond to a leakage current in the nominal range of 6 to 30 milliamperes.

27. A leakage current protection device claimed in claim 26 and further comprising regulating means to provide a substantially constant operating voltage for said circuit opening means over a range of line-to-neutral AC input voltages of 70 to 264 volts.

* * * * *